(12) United States Patent
Aston et al.

(10) Patent No.: US 10,907,697 B2
(45) Date of Patent: Feb. 2, 2021

(54) TORSION BAR MOUNTING DEVICE

(71) Applicant: The Boeing Company, Chicago, IL (US)

(72) Inventors: Richard W. Aston, Brea, CA (US); Michael John Langmack, Huntington Beach, CA (US); Jazzmin P. Martinez, Los Angeles, CA (US); Emily Colleen Woods, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 15/959,094

(22) Filed: Apr. 20, 2018

(65) Prior Publication Data

US 2019/0323571 A1    Oct. 24, 2019

(51) Int. Cl.
*F16F 1/16*    (2006.01)
*B64D 47/02*   (2006.01)

(52) U.S. Cl.
CPC ............... *F16F 1/16* (2013.01); *B64D 47/02* (2013.01)

(58) Field of Classification Search
CPC ........... F16F 1/16; F16F 1/373; B64C 27/001; B64C 27/33; B64D 47/02; B64D 47/08
USPC ..... 267/273, 279, 280, 281, 160; 244/17.27, 244/17.25; 248/559, 560, 587
See application file for complete search history.

(56) References Cited

U.S. PATENT DOCUMENTS

| 3,620,088 | A | * | 11/1971 | Alford | F16C 11/12 74/485 |
| 4,458,862 | A | * | 7/1984 | Mouille | B64C 27/001 188/379 |
| 5,374,012 | A | * | 12/1994 | Marchand | B64D 47/08 244/118.1 |
| 6,325,327 | B1 | * | 12/2001 | Zoppitelli | B64C 27/001 244/17.27 |
| 6,578,835 | B2 | * | 6/2003 | Monson | F16F 1/373 188/379 |
| 2016/0159474 | A1 | * | 6/2016 | Pfaller | B64C 27/33 416/134 A |

* cited by examiner

*Primary Examiner* — Pamela Rodriguez
(74) *Attorney, Agent, or Firm* — Kolisch Hartwell, P.C.

(57) ABSTRACT

A mounting device is disclosed, including a first torsion bar structure having an elongated axis and opposing end portions connected by a middle portion. The mounting device further includes a second torsion bar structure having an elongated axis and opposing end portions connected by a middle portion. The middle portions of the first and second torsion bar structures are connected. The end portions of the first torsion bar structure are configured for attachment to a vehicle, and the end portions of the second torsion bar structure are configured for attachment to an accessory. The first and second torsion bar structures are configured to decrease transmission of vibration frequencies between the vehicle and the accessory.

20 Claims, 10 Drawing Sheets

TORSION BAR MOUNTING DEVICE

FIELD

This disclosure relates to systems and methods for passive vibration isolation. More specifically, the disclosed embodiments relate to passive vibration isolation of vehicle mounted accessories.

INTRODUCTION

Vibrations are a common undesirable byproduct of many mechanical systems, such as vehicle engines. Propagating in mechanical waves, the vibrations are transmitted to connected systems, where they may have adverse effects. Some connections conduct vibrations more efficiently than others, and connections are often chosen to limit vibration transmission.

Such connections generally include a vibration isolator, which may be active or passive. Most active isolators include powered actuators to produce destructive interference. Passive isolators include materials and mechanical systems that absorb and damp the vibration. Examples of passive isolators include mass-spring dampers, pneumatic dampers, and elastomer spacers. Each type of vibration isolator is limited in the amplitude and frequencies for which it is effective, and an isolator is often chosen or tuned for a specific application and the associated expected vibrations.

Many isolators, particularly those with moving parts, are delicate and susceptible to wear, heavy loading, or intrusion of dust and debris. Mounting vibration sensitive equipment to vehicles can therefore be difficult. A sufficiently robust connection may transmit undesirable levels of vibration, while an effective vibration isolator may require frequent repair or replacement. Military vehicles that operate in hazardous environments pose a particular challenge.

A rugged mounting device is therefore desirable, that can withstand environmental hazards such as temperature fluctuation and exposure to weather, while providing significant vibration filtering at anticipated amplitudes and frequencies.

SUMMARY

The present disclosure provides systems, apparatuses, and methods relating to a torsion bar mounting device. In some embodiments, a mounting device may include a first torsion bar structure having an elongated axis and opposing end portions connected by a middle portion. The mounting device may further include a second torsion bar structure having an elongated axis and opposing end portions connected by a middle portion. The middle portions of the first and second torsion bar structures may be connected. The end portions of the first torsion bar structure may be configured for attachment to a vehicle, and the end portions of the second torsion bar structure may be configured for attachment to an accessory. The first and second torsion bar structures may be configured to decrease transmission of vibration frequencies between the vehicle and the accessory.

In some embodiments, a carrying system may include a vehicle configured to travel in one or more directions, an accessory, and a torsion bar mounting device. The mounting device may have first and second elongated bar members extending from a hub portion, the first elongated bar member having opposing end portions configured for attachment to the vehicle, the second elongated bar member having opposing end portions configured for attachment to the accessory. Each torsion bar member may be configured to decrease transmission of vibration frequencies between the vehicle and the accessory.

A method of mounting an accessory on a vehicle may include providing a torsion bar device having first and second bar structures extending from a common hub portion. Each bar structure may have an elongated axis and opposing head portions connected by a middle portion, the elongated axis of the first bar member forming an angle with the elongated axis of the second bar structure. The method may further include fastening the head portions of the first bar structure to a vehicle and fastening the head portions of the second bar structure to an accessory. The middle portions of the bar structures may be configured to decrease transmission of vibration between the vehicle and the accessory.

Features, functions, and advantages may be achieved independently in various embodiments of the present disclosure, or may be combined in yet other embodiments, further details of which can be seen with reference to the following description and drawings.

DETAILED DESCRIPTION

Various aspects and examples of a mounting device having first and second torsion bar structures, as well as related methods, are described below and illustrated in the associated drawings. Unless otherwise specified, a mounting device in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

In general, a mounting device in accordance with the present teachings may include first and second torsion bar structures. A mounting device may be included in a carrying or mounting system, and/or may be referred to as a torsion bar device. The mounting device may be configured to mount an accessory to a vehicle, and to decrease or reduce transmission of one or more vibration frequencies between the vehicle and the accessory. The mounting device may be configured to connect any two structures in a loaded vibrational environment.

Figure 1:
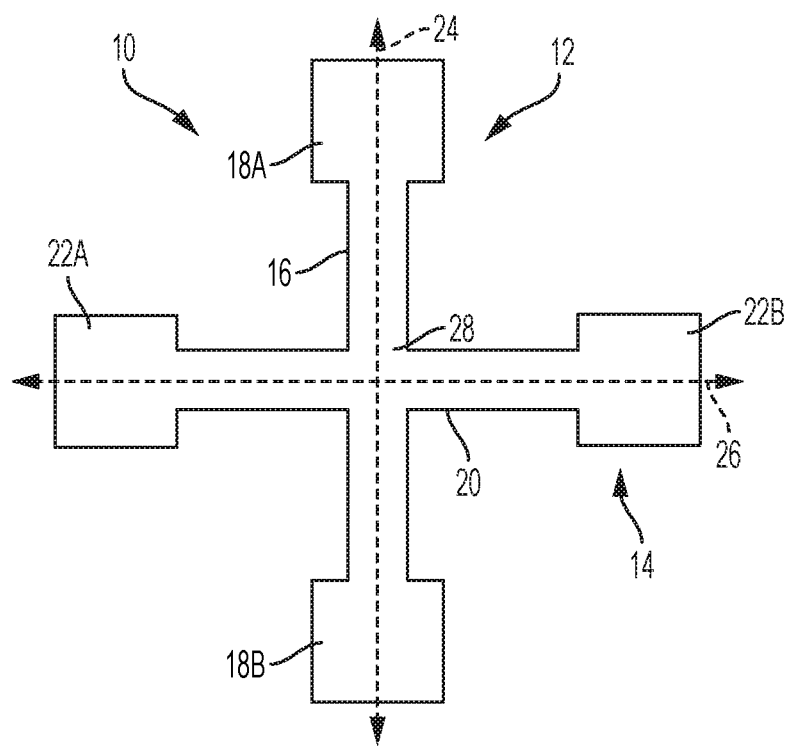
FIG. 1 is a schematic diagram of an illustrative torsion bar device in accordance with aspects of the present disclosure.

FIG. 1 is a schematic diagram of a mounting device, generally indicated at 10. The mounting device includes a first torsion bar structure 12 and a second torsion bar structure 14. The first torsion bar structure includes two opposing end portions 18A, 18B that are connected by a middle portion 16. Similarly, the second torsion bar structure includes two opposing end portions 22A, 22B that are connected by a middle portion 20.

First torsion bar structure 12 has an elongated axis 24, along which middle portion 16 extends. Second torsion bar structure 14 has an elongated axis 26 generally perpendicular to elongated axis 24, along which middle portion 20 extends. The mounting device may be described as plus-sign or cross shaped. Elongated axes 24, 26 may also be referred to as elongate, lateral, or long axes. In the present disclosure, the terms elongate and elongated may be used interchangeably.

In the present example, mounting device 10 includes two approximately perpendicular torsion bar structures. In some examples, a mounting device may include three or more torsion bar structures or bar members. In some examples, torsion bar structures of a mounting device may be regularly angularly spaced, or may be at any desired angle to one another. In some examples, mounting device may include only one torsion bar structure. In such examples, the torsion bar structure may be configured for connection at two ends and at a central point.

Middle portions 16, 20 are connected by a common hub portion 28. The hub portion may also be described as an intersection of middle portions 16, 20, or torsion bar structures 12, 14 may be described as extending from hub portion 28. The first and second torsion bar structures and the hub portion may be all be formed from a single piece of material. That is, mounting device 10 may be unitary, or all one piece.

In the depicted example, first torsion bar structure 12 and second torsion bar structure 14 are co-planar. That is, the torsion bar structures extend within the plane defined by elongated axes 24 and 26. In some examples, hub portion 28 may have a thickness different from one or both of the torsion bar structures and the torsion bar structures may therefore be non-planar. That is, hub portion 28 may space the first torsion bar structure from the second torsion bar structure along a direction perpendicular to both elongated axis 24 and elongated axis 26.

Mounting device 10 may be configured to resist fatigue, wear, or other damage associated with regular use. The device may comprise a material appropriate to resist damage and/or may be dimensioned for appropriate structural strength. Mounting device 10 may be further configured to maintain key structural properties in adverse conditions. For example, the device may comprise a metal that maintains appropriate ductility in high-altitude temperatures and/or extreme winter weather.

Figure 2:
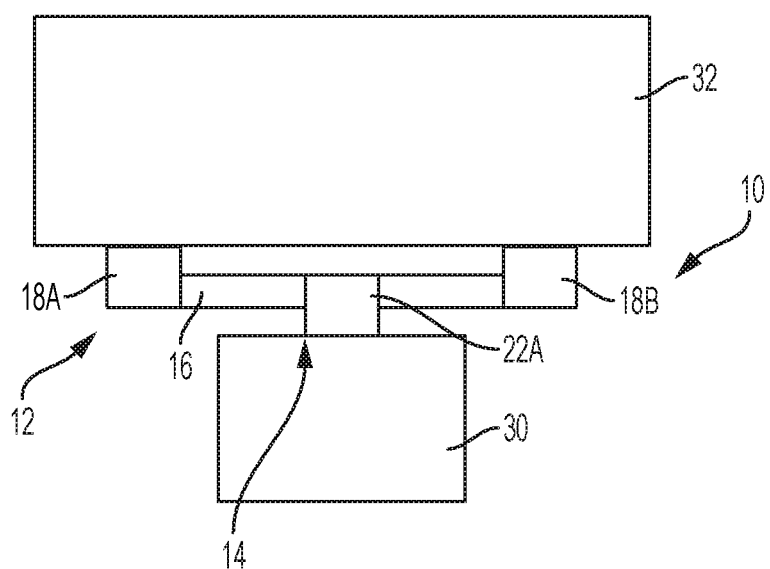
FIG. 2 is a schematic diagram of the torsion bar device of FIG. 1, mounting an accessory to a vehicle.

FIG. 2 is a schematic diagram of mounting device 10, mounting an accessory 30 to a vehicle 32. End portions 18A, 18B of first torsion bar structure 12 are configured for attachment to vehicle 32, and end portions 22A, 22B of second torsion bar structure 14 are configured for attachment to accessory 30. Each end portion may connect to the corresponding structure in any effective manner. For example, each end portion may include one or more apertures and may be bolted to the corresponding structure. For another example, each end portion may be welded or bonded to an appropriate surface on the corresponding structure.

End portions 18A, 18B, 22A, and 22B may be sized and/or shaped to facilitate attachment. In the depicted example, the end portions are enlarged relative to middle portions 16, 20. In some examples, the end portions may match the middle portions, or may be smaller than the middle portions. Configuration of the end portions may be independent of expected vibrational modes and/or frequencies.

Forces acting on vehicle 32 or accessory 30, such as the mechanical wave of a vibration, may cause first and/or second torsion bar structures 12, 14 of mounting device 10 to deflect from a rest position. Accessory 30 and vehicle 32 are prevented from relative lateral translational motion by connection to mounting device 10. Forces applied laterally may instead result in a rotation of the accessory and one or both torsion bar structures of the mounting device. Each torsion bar structure may rotate about the elongate axis of the other torsion bar structure.

First torsion bar structure 12 may rotate about elongate axis 26 of second torsion bar structure 14, and as a result second torsion bar structure 14 may be twisted around elongated axis 26. Similarly, second torsion bar 14 may rotate about elongate axis 24 of first torsion bar structure 12, and as a result first torsion bar structure 12 may be twisted around elongated axis 24.

First and second torsion bar structures 12, 14 may resist the applied torque or torsion according to their stiffness and/or torsional rigidity, and tend to restore the mounting device to the rest position. In the harmonic motion resulting from a sinusoidal driving force such as a vibration, this response may act as a damping force and/or destructive interference, reducing the vibration transmitted from mounting device 10 to accessory 30. The torsional damping may be characterized by the stiffness, torsional rigidity and/or other properties of the twisted torsion bar structure or structures.

Any vibrational or other force transferred from vehicle 32 may be expressed as including three orthogonal components, typically a vertical component and two horizontal components. The orthogonal configuration of first and second torsion bar structures 12, 14 may allow mounting device 10 to damp two components of a transferred force. In other words, mounting device 10 may provide torsional damping for forces parallel to a plane of the mounting device as defined by elongated axes 24, 26.

In some examples, the two torsion bar structures may also bend or flex along their length in response to forces applied perpendicular to the plane of mounting device 10. The torsion bar structures may resist such a perpendicular force according to their stiffness, and tend to restore the mounting device to the rest position. This response may result in a flexional damping, allowing mounting device 10 to damp the third component of a transferred force. The flexional damping may be characterized by the stiffness and/or other properties of the two flexed torsion bar structures.

Vibrations or other forces transferred from vehicle 32 may have a predictable orientation relative to the vehicle. For example, forces associated with vehicle acceleration may occur primarily along a direction of travel of the vehicle. For another example, vibrations may be primarily incident along a direction from an engine of the vehicle to the accessory. Mounting device 10 may be oriented to correspond to an expected force direction. For example, elongated axis 24 of first torsion bar structure 12 may be aligned with a primary direction of motion of vehicle 32 such as a direction of travel or a direction of other frequently recurrent motion.

In order for mounting device 10 to produce a damping force in response to a forcing frequency from vehicle 32, first and second torsion bar structures 12, 14 may need to both rotate and twist. Accordingly, each torsion bar structure may be at least partially spaced from both vehicle 32 and accessory 30. The necessary spacing may be provided by any effective configuration of the attachment of mounting device 10 to the vehicle and accessory.

In the present example, as shown in FIG. 2, the end portions of the torsion crossbars are enlarged on one side. Mounting device 10 may be described as having a vehicle-facing side and an accessory-facing side. On the vehicle-facing side, end portions 18A, 18B of first torsion bar structure 12 are raised relative to middle portions 16, 20 and end portions 22A, 22B. End portions 18A, 18B contact vehicle 32, while the rest of mounting device 10 is thereby spaced from the vehicle.

Similarly, on the accessory-facing side of mounting device 10, end portions 22A, 22B of second torsion bar structure 14 are raised relative to middle portions 16, 20 and end portions 18A, 18B. End portions 22A, 22B contact accessory 30, while the rest of mounting device 10 is thereby spaced from the accessory. In some examples, connecting portions of vehicle 32 and/or accessory 30 may be recessed or otherwise configured to allow space for motion of mounting device 10. In some examples, mounting device 10 may be connected to vehicle 32 and or accessory 30 by a mounting or adaptor plate structure configured to appropriately space the mounting device.

Efficacy of mounting device 10 may be improved when damping forces resulting from the torsional resistance and/or stiffness of first and second torsion bar structures 12, 14 are tuned to correspond to one or more expected vibrational frequencies of vehicle 32. Expected vibrations of vehicle 32 may be characterized prior to mounting of accessory 30, and mounting device 10 may be designed such that the damping forces are tuned accordingly. The mounting device may be designed to have a selected precise placement of system modes, which may mitigate dynamic coupling with forcing frequencies of vehicle 32.

In some examples, mounting device 10 may be tuned to act as a low pass filter. That is, the mounting device may be configured to filter out high frequency vibrations. In some examples, mounting device 10 may be tuned to filter out one or more natural frequencies of accessory 30. Such tuning may protect accessory 30 from damagingly high loading experienced as a result of vibration at a natural or resonant frequency of the accessory.

Mounting device 10 may be tuned by selecting materials and/or geometry of middle portions 16, 20. The middle portions may be designed to have a desired response to twisting and bending forces by selection of material, cross-sectional shape, and length. Expected forces may be calculated based on forcing frequencies of vehicle 32, and/or properties of accessory 30 such as weight and air resistance. Mounting device 10 may exhibit linear behavior, facilitating calculation of dynamic responses and tuning of the device.

Mounting device 10 may also be tuned by selecting materials and/or geometry of hub portion 28. The hub portion may be rectangular or rounded, may be of equal thickness to the torsion bar structures or of different dimensions, or may have any effective shape. Hub portion 28 and/or the geometry of the connection between middle portions 16, 20 may affect the response of the torsion bar structures to twisting forces, and may be configured to produce a desired response.

Mounting device 10 may comprise any appropriate material or materials. Middle portions 16, 20 may be cylindrical, rectangular, or any elongate shape. The middle portions may also have any appropriate cross-sectional shape or combination of shapes. Mounting device 10 may be configured to occupy and operate within a limited space, in other words the device may be compact.

EXAMPLES, COMPONENTS, AND ALTERNATIVES

The following sections describe selected aspects of exemplary mounting devices as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Mounting System

Figure 3:
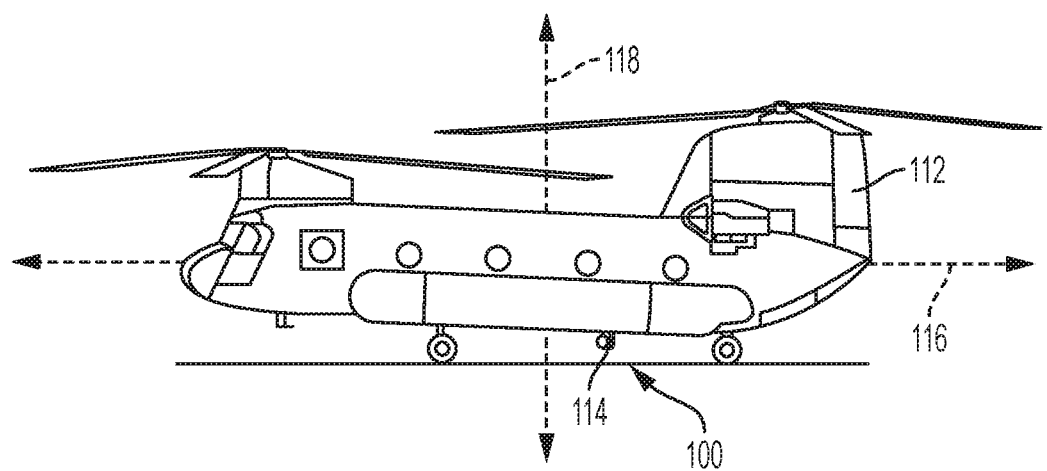
FIG. 3 is a side view of an illustrative helicopter, with a mounted searchlight.

As shown in FIGS. 3-17, this section describes an illustrative mounting system generally indicated at 100. The mounting system includes a torsion bar device 110, shown in FIGS. 5-13, which is an example of mounting device 10, described above. The torsion bar device may also be referred to as a torsion cross. A helicopter 112 is depicted in FIG. 3, with a searchlight 114 attached to an undercarriage of the helicopter by mounting system 100. The searchlight may also be electrically connected to systems of helicopter 112, so that the light may be remotely operated.

Although generally capable of motion in any direction in open space, helicopter 112 may be described as having a primary forward direction of travel 116. Perpendicular to the primary direction, the helicopter may also have a secondary or lateral direction of travel, and a vertical direction of travel or vertical axis 118.

Helicopter 112 may be a military or rescue helicopter, which operates in hazardous conditions. The helicopter may therefore be exposed to extreme temperatures, wet weather, abrasive sandstorms, and other adverse environments. Helicopter 112 may produce numerous strong sinusoidal forcing frequencies from sources such as engines, rotors, or air currents resulting from motion of rotor blades.

Searchlight 114 may include electrical, optical, and mechanical systems, each of which may include delicate components. For example, glass bulbs or reflectors may be susceptible to damage. Even relatively robust components of the searchlight may be vulnerable to wear over time under constant loading resulting from vibrations transmitted from helicopter 112.

Figure 4:
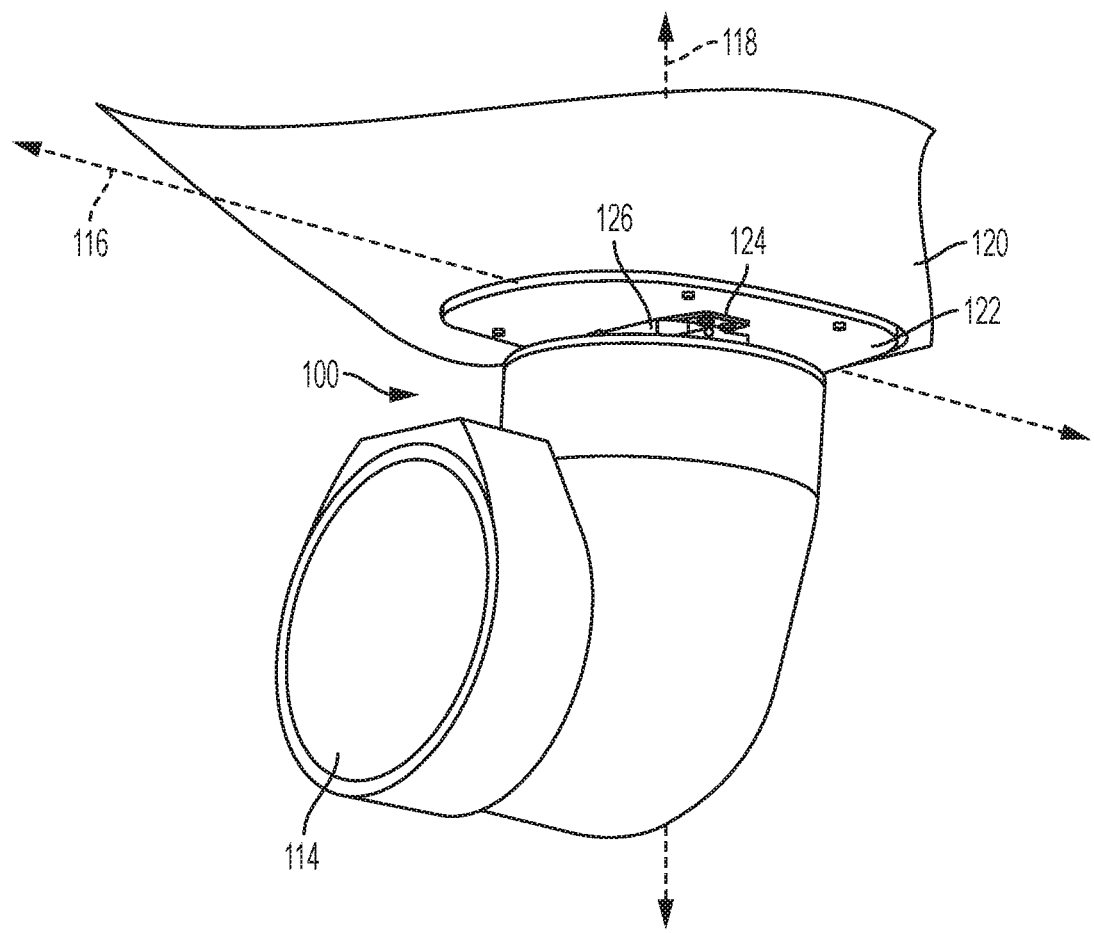
FIG. 4 is an isometric view of the mounting system of the searchlight of FIG. 3.

Mounting system 100, shown more clearly in FIG. 4, is configured to reduce transmission of vibrations from helicopter 112 to searchlight 114. Such reduction may improve operational lifetime of both searchlight 114 and of components connecting the searchlight to the helicopter. Searchlight 114 is mounted to an airframe of the helicopter, through an outer skin 120. The searchlight is mounted at an underside or lower surface of helicopter 112, suspended vertically below the helicopter.

In some examples, searchlight 114 may be mounted to a fuselage, tail, landing gear, or other structures of helicopter 112. Any mount location providing a sufficiently secure connection may be used. In some examples, searchlight 114 may be mounted in an orientation other than vertical. For instance, searchlight 114 may be mounted extending laterally from a non-retracting landing gear strut.

Mounting system 100 may be oriented relative to helicopter 112 and searchlight 114 as described below, irrespective of the mount location and orientation of the searchlight. In some examples, mounting system 100 may be configured according to the mount location and orientation of the searchlight. For instance, a stiffness of the mounting system may be selected according to the direction of gravitational forces on the mounting system for a given mount orientation.

As shown in FIG. 4, mounting system 100 includes a cover plate 122, fastened to outer skin 120. The cover plate may be shaped to provide a desired aerodynamic profile, and may help protect components of mounting system 100 from environmental conditions. Cover plate 122 includes a central aperture, configured to receive an adaptor plate 124.

Adaptor plate 124 is coupled to searchlight 114, and spaced from the searchlight, by a dovetail assembly 126. The adaptor plate is received in the central aperture of cover plate 122, but is not connected to the cover plate. Adaptor plate 124 may therefore be free to move relative to cover plate 122 and helicopter skin 120. The non-circular shape of adaptor plate 124 and corresponding shape of the aperture in cover plate 122 may prevent rotation of the adaptor plate in the plane of the adaptor plate. That is, adaptor plate 124 and therefore the connected searchlight may be prevented from rotating about vertical axis 118.

Figure 5:
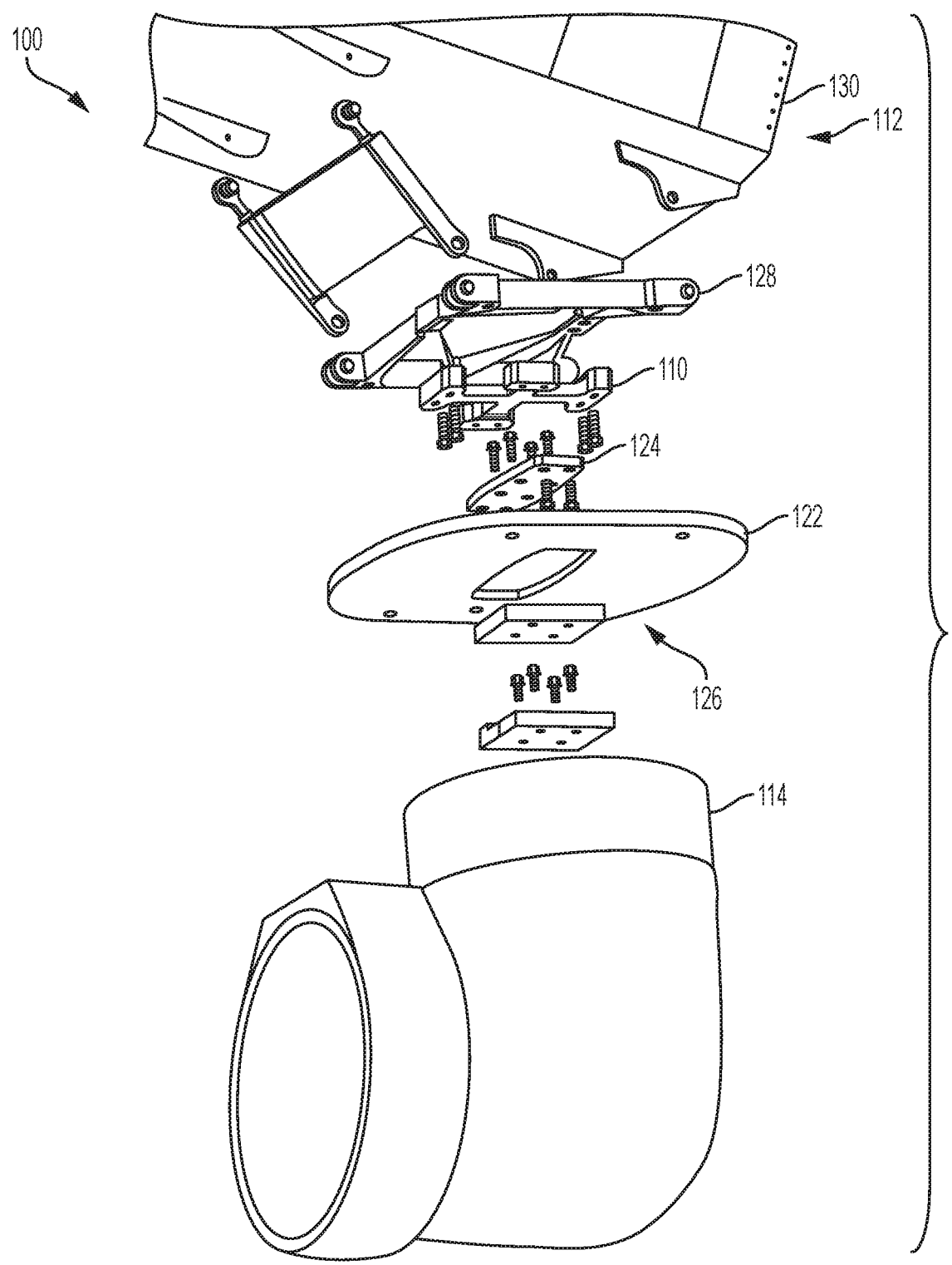
FIG. 5 is an exploded isometric view of the mounting system of FIG. 4.

FIG. 5 is an exploded view of mounting system 100, with helicopter skin 120 omitted. In addition to cover plate 122 and adaptor plate 124, the mounting system further includes torsion cross 110 and a mount plate 128. Mount plate 128 is configured for attachment to an airframe structure 130 of helicopter 112. In the present example, mount plate 128 includes four pins, which are received in apertures of airframe portion 130 to suspend the mount plate. Any effective connection of mount plate 128 and airframe portion 130 may be used.

Dovetail assembly 126, adaptor plate 124, and mount plate 128 may be described as part of a connection assembly for torsion cross 110. They may be configured to effectively couple the torsion cross to searchlight 114 and helicopter 112, while allowing a desired range of motion of the torsion cross. Each component may comprise any material or materials appropriate to operating conditions of helicopter 112, and may include one or more sub-components. The connection assembly may include additional and/or alternative components. The connection assembly may also include any number and type of fasteners.

In some examples, torsion cross 110 may be mounted directly to airframe portion 130 of helicopter 112 and to searchlight 114. In such examples, geometry of torsion cross 110 may be constrained by structural properties of the airframe and/or searchlight. For example, torsion cross 110 may need to have a length of at least a spacing between two airframe members to allow mounting to the two members. Such geometrical constraints on torsion cross 110 may in turn constrain tuning of the device, as discussed further below. Use of a connection system such as the depicted system may eliminate such geometrical constraints.

Figure 6:
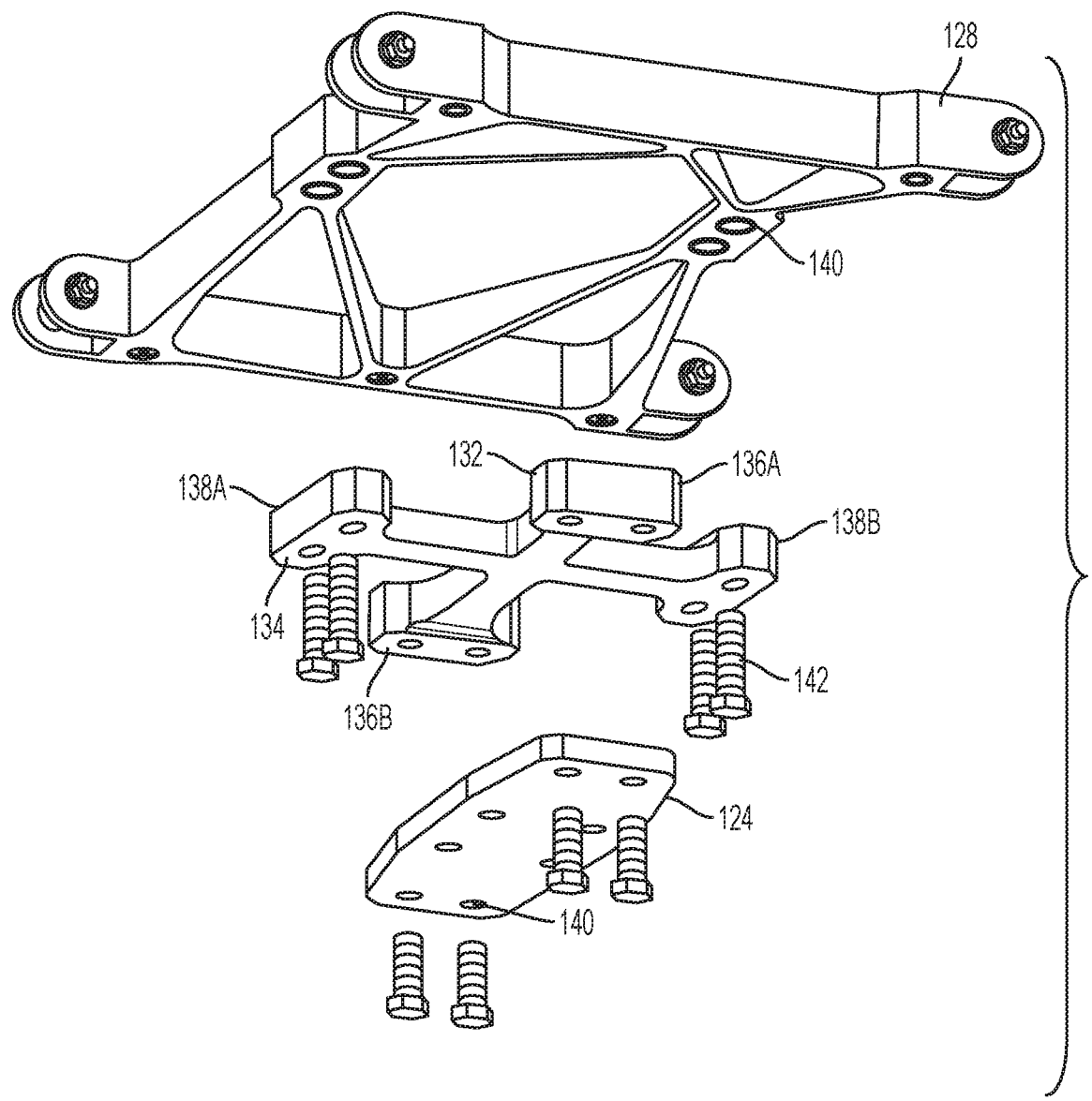
FIG. 6 is an exploded isometric view of components of the mounting system of FIG. 4, including a torsion bar device.

Torsion cross 110 includes a first bar 132 and a second bar 134 as illustrated in FIG. 6. The first and second bars may also be described as torsion bar structures and/or elongate bar members. The two bars 132, 134 are connected to form a plus-sign or cross shape. First bar 132 includes opposing head portions 136A, 136B, which are fastened to mount plate 128. Second bar 134 includes opposing head portions 138A, 138B, which are fastened to adaptor plate 124.

Torsion cross 110 is configured such that bars 132, 134 may twist relative to each other, in response to vibrations of helicopter 112 or other relative motion between the helicopter and searchlight 114. Details of that twisting motion are further described below. In the present example, first bar 132 is fixed relative to helicopter 112 and second bar 134 is fixed relative to searchlight 114.

Mounting system 100 is oriented relative to helicopter 112 and searchlight 114 such that predominant loading responses to forcing frequencies are damped. In the present example, searchlight 114 may experience loading primarily in fore-aft and side-side directions. In other words, loading may be predominantly parallel or orthogonal to primary direction of travel 116 of helicopter 112, shown in FIGS. 3-4. Accordingly, torsion cross 110 of the mounting system is oriented with first bar 132 parallel to the primary direction of travel.

In some examples, helicopter 112 or another vehicle may generate a forcing frequency propagating at an angle relative to the primary direction of travel. In some examples, properties of searchlight 114 or another accessory such as weight distribution or geometry may result in loading and/or motion in a direction at an angle relative to the primary direction of travel. In such examples, torsion cross 110 may be oriented with first bar 132 or second bar 134 at that angle relative to the primary direction of travel. Torsion cross 110 may be oriented with first bar 132 or second bar 134 parallel to some other primary direction of motion of helicopter 112. Torsion cross 110 and/or other components of mounting system 100 may also be oriented in any configuration providing desired damping, filtering and/or vibration isolation.

Each of heads 136A, 136B, 138A, and 138B includes a pair of apertures 140, which can be seen more clearly in FIG. 6. Mount plate 128 includes two pairs of apertures 140, spaced to correspond to the aperture pairs of heads 136A, 136B of first bar 132. Each aperture is sized to receive a bolt 142. First bar 132 is fastened to mount plate 128 by four bolts 142 extending through the corresponding pairs of apertures 140 on the first bar and the mount plate. Similarly, adaptor plate 124 includes two pairs of apertures 140, spaced to correspond to the aperture pairs of heads 138A, 138B of second bar 134. Each aperture is sized to receive a bolt 142. Second bar 134 is fastened to adaptor plate 124 by four bolts 142 extending through the corresponding pairs of apertures 140 on the second bar and the adaptor plate.

Figure 7:
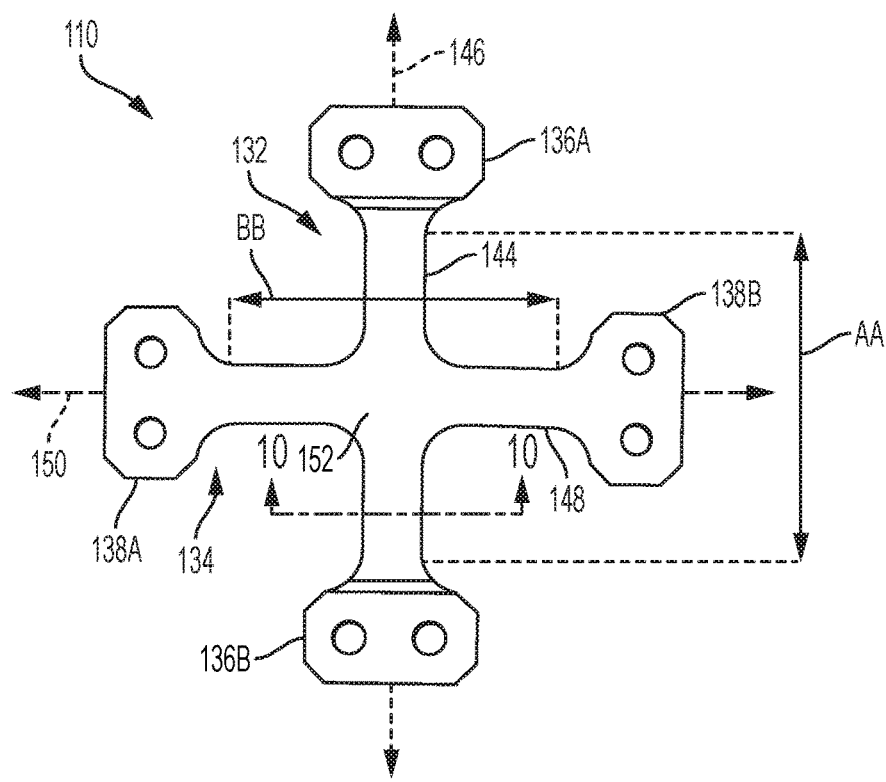
FIG. 7 is a top view of the torsion bar device of FIG. 6.

FIG. 7 shows a top view of torsion cross 110. First bar 132 has a middle portion 144 connecting heads 136A, 136B. The middle portion is an elongate member having a rectangular cross-section and a length AA. The extent of middle portion 144 defines an axis 146 of first bar 132. Second bar 134 has a middle portion 148 connecting heads 138A, 138B. Middle portion 148 is an elongate member having a rectangular cross-section and a length BB. The extent of middle portion 148 defines an axis 150 of second bar 134, which is substantially perpendicular to axis 146.

In the present example, lengths AA and BB are equal. First bar 132 and second bar 134 are also of matching length. The lengths, which affect the flex and/or twist response of the torsion cross, may be selected to tune torsion cross 110 as desired, and/or to correspond to expected vibrations of the helicopter. In some examples, lengths AA and BB may differ. The length of each middle portion may be selected to minimize transmission of vibration frequencies from the helicopter to the searchlight.

Middle portions 144, 148 of first bar 132 and second bar 134 connect in a central hub 152. The cross may also be described as having four arms extending out from central hub 152, such that a first pair of two arms are parallel and a second pair of two arms are parallel. The two bars, or four arms, of torsion cross 110 are part of one structure. In other words, torsion cross 110 is formed from a single piece of material.

In the present example, torsion cross 110 is machined titanium alloy. The cross may also be cast, additively manufactured, or produced by any method providing desired material properties. The cross may comprise any metal alloy or material having desirable properties.

As shown in FIG. 7, first bar 132 and second bar 134 meet at right angles, forming four interior corners. In the present example, the corners are rounded or filleted. Hub 152 may also be described as having a rounded or curved shape. This rounding may improve the strength of the connection between the bars, and/or improve fatigue stress resistance of the cross. Similarly, corners at connections between each middle portion and head are rounded and may provide improved structural strength.

Heads 136A and 136B of first bar 132 are matching in size and shape, though mirrored in horizontal orientation. Heads 138A and 138B of second bar 134 are similarly matching and horizontally mirrored. The heads of first bar 132 may be described as vertically mirrored relative to the heads of second bar 134. Each head is generally rectangular, with chamfered corners and filleted connections to the adjacent middle portion. The heads are enlarged relative to the middle portions. Each head may be configured to provide a solid, stable connection to an adjacent component of mounting system 100. In some examples, some or all of the heads may differ in shape and/or size.

Figure 8:
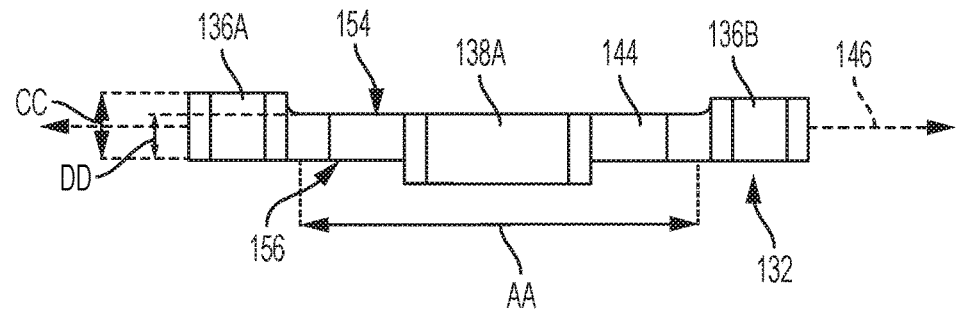
FIG. 8 is a side view of the torsion bar device of FIG. 6.
Figure 9:
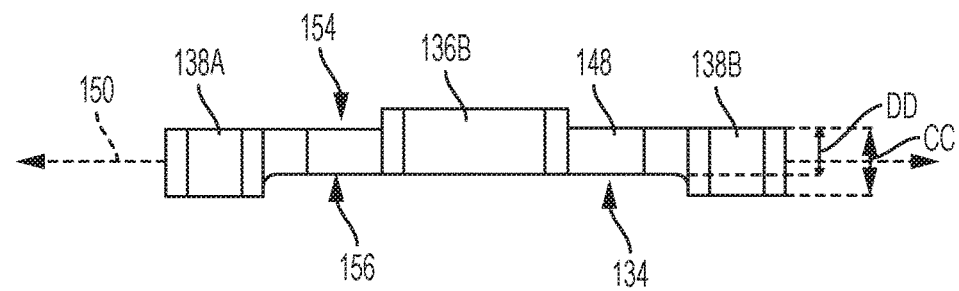
FIG. 9 is another side view of the torsion bar device of FIG. 6, in a direction generally orthogonal to FIG. 8.

FIG. 8 is a side view of torsion cross 110, looking along axis 150 of second bar 134. FIG. 9 is another side view of the torsion cross, instead looking along axis 146 of first bar 132. As shown in these side views, each head 136A, 136B, 138A, and 138B has a thickness CC, which is greater than a thickness DD of middle portions 144, 148. The difference between thicknesses CC and DD may be referred to as a spacing depth. The spacing depth may be selected based on an expected or desired range of motion of the first and/or second bars of the torsion cross. In some examples, the spacing depth may differ between first bar 132 and second bar 134. In some examples, the spacing depth may differ between each head.

Torsion cross 110 may be described as having a top surface 154 and a bottom surface 156, defined by middle portions 144, 148 and hub 152. The top and bottom surfaces are substantially flat and/or planar. Heads 136A, 136B of first bar 132 are flush with bottom surface 156, but extend up from top surface 154 by the spacing depth. Similarly, heads 138A, 138B of second bar 134 are flush with top surface 154, but extend down from bottom surface by the spacing depth.

Both top surface 154 and bottom surface 156 of torsion cross 110 may be thereby spaced from mount plate 128 and adaptor plate 124, shown in FIG. 6. The raised heads of the torsion cross may also be described as spacing the middle portions of the first and second bars from adjacent structures. This spacing may allow twisting and/or rotational motion of torsion cross 110 when mounted.

Figure 10:
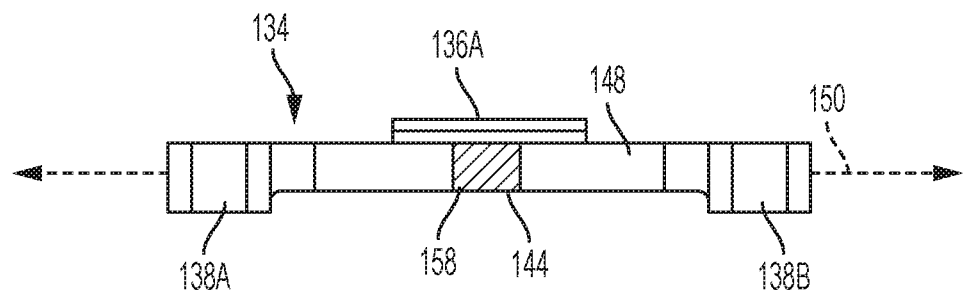
FIG. 10 is a cross-sectional view of the torsion bar device of FIG. 6, along line 10-10 in FIG. 7.

FIG. 10 is a cross-sectional view of torsion cross 110, along line 10-10 in FIG. 7. A rectangular cross-sectional shape 158 of middle portion 144 is shown. In the present example, middle portion 148 has a matching cross-sectional shape. Cross-sectional shape 158 is configured to provide a desired stiffness of first bar 132. The dimensions and geometry of the shape may be selected to tune torsion cross 110 as desired, and/or to correspond to expected vibrations of the helicopter. The cross-sectional shape of each middle portion may be selected to minimize transmission of vibration frequencies from the helicopter to the searchlight.

Figure 11:
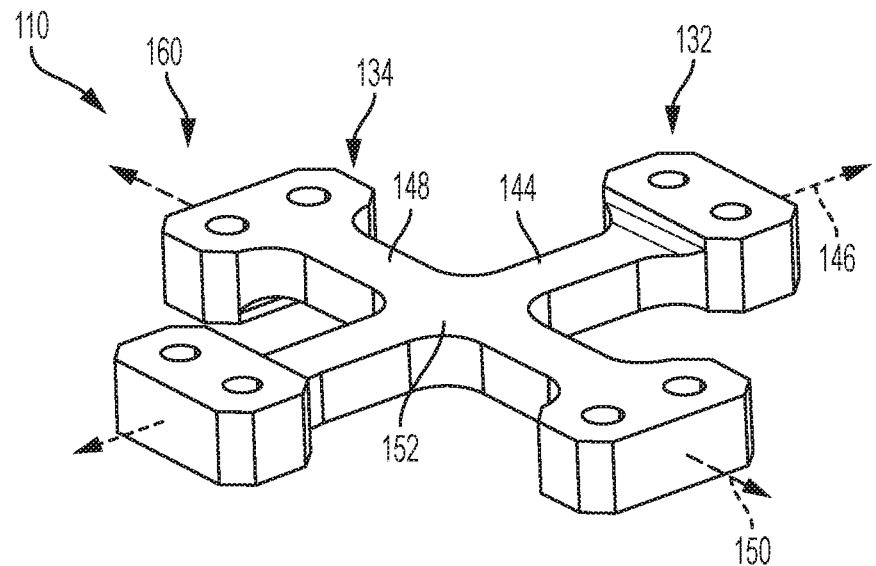
FIG. 11 is an isometric view of the torsion bar device of FIG. 6.

FIG. 11 shows torsion cross 110 in a rest position 160. The torsion cross may default to the rest position when not under any forces or loads. The torsion cross may also resist perturbation away from the rest position according to a stiffness of first bar 132 and second bar 134. In rest position 160, both top surface 154 and bottom surface 156 of torsion cross 110 are planar, and each surface is parallel to a plane defined between axis 146 of first bar 132 and axis 150 of second bar 134.

In some examples, rest position 160 may be otherwise configured. For instance, middle portions 144, 148 of torsion cross 110 may be cylindrical and surface 154, 156 may therefore be non-planar. For another instance, torsion cross 110 may be configured to mount the searchlight at an angle relative to the undercarriage of the helicopter, and second bar 134 may be deflected in the rest position.

Referring briefly back to FIG. 4, it can be seen that mounting system 100 fixes searchlight 114 relative to helicopter 112 such that the searchlight is unable to translate relative to the helicopter in any direction parallel to a plane including primary direction of travel 116 and the secondary direction of travel. Forces acting in that plane may instead result in a rotation of the searchlight and therefore a rotation or deflection of one or both bars of the torsion cross from the rest position. In other words, forces pushing fore-aft or side-side on the searchlight may cause the light to rotate, and therefore cause the torsion cross to twist.

Figure 12:
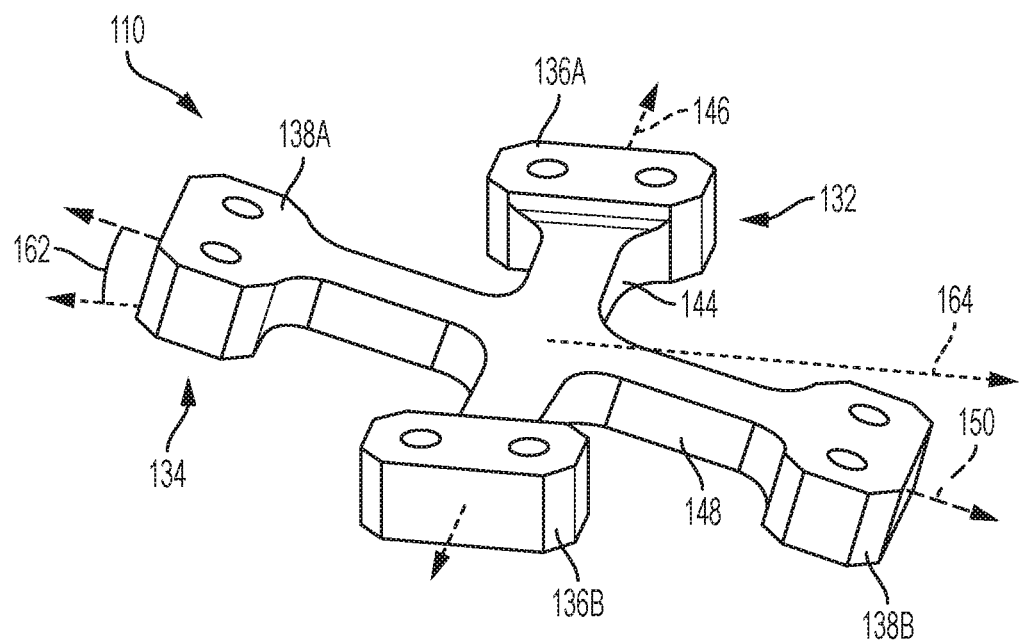
FIG. 12 is an isometric view of the torsion bar device of FIG. 6, under torque about a first axis.
Figure 13:
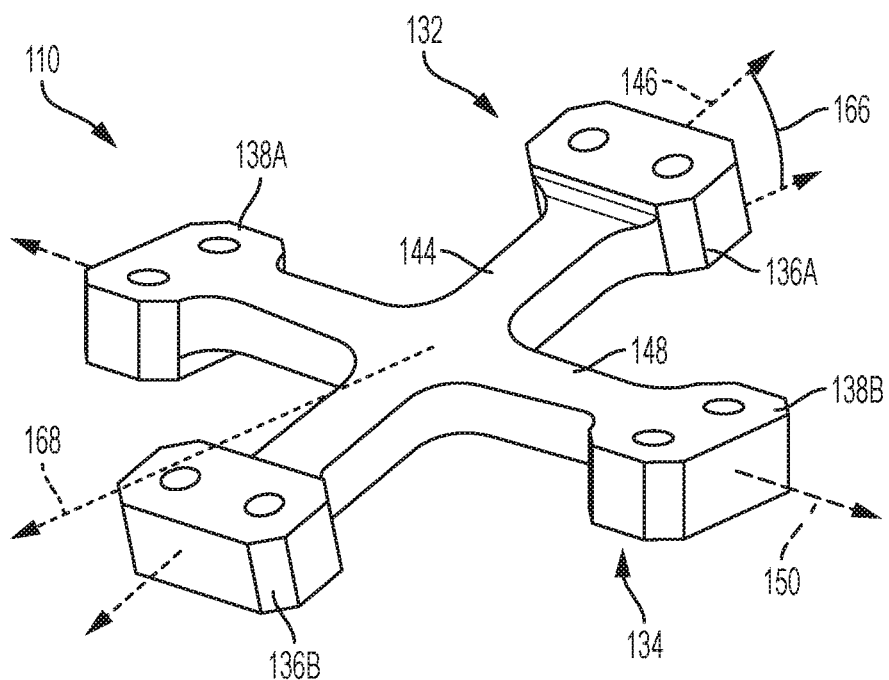
FIG. 13 is another isometric view of the torsion bar device of FIG. 6, under torque about a second axis.

FIGS. 12-13 depict deflection of the bars of torsion cross 110. FIG. 12 shows a deflection of second bar 134, which may correspond to a side-side swing of the searchlight. Second bar 134, including middle portion 148 and heads 138A, 138B remains aligned along axis 150. The second bar is rotated about axis 146 of first bar 132 by an angle 162. In other words, axis 150 forms angle 162 with the rest position 164 of the axis, and with the plane defined by axes 146, 150 in rest position 160. Consequently, first bar 132 is twisted about axis 146 and is under torsion from the torque applied by second bar 134.

FIG. 13 shows a deflection of first bar 132, which may correspond to a fore-aft swing of the searchlight. First bar 132, including middle portion 144 and heads 136A, 136B remains aligned along axis 146. The first bar is rotated about axis 150 of second bar 134 by an angle 166. In other words, axis 146 forms angle 166 with the rest position 168 of the axis, and with the plane defined by axes 146, 150 in rest position 160. Consequently, second bar 134 is twisted about axis 150 and is under torsion from the torque applied by first bar 132.

FIGS. 14-17 are graphs of a comparative simulation between a torsion bar mount such as mounting system 100 as described above and shown in FIG. 4-5, and a hard mount typical of the current state of the art. A likely vibration frequency for a Chinook helicopter was simulated as incident parallel to an x-axis and as parallel to a y-axis, where the x-axis corresponds to the secondary direction of travel of helicopter 112 as described above and the y-axis corresponds to primary direction of travel 116. Listed on each graph is a peak and a root mean square simulated load response of the searchlight, for each of the x, y, and z axes.

Figure 14:
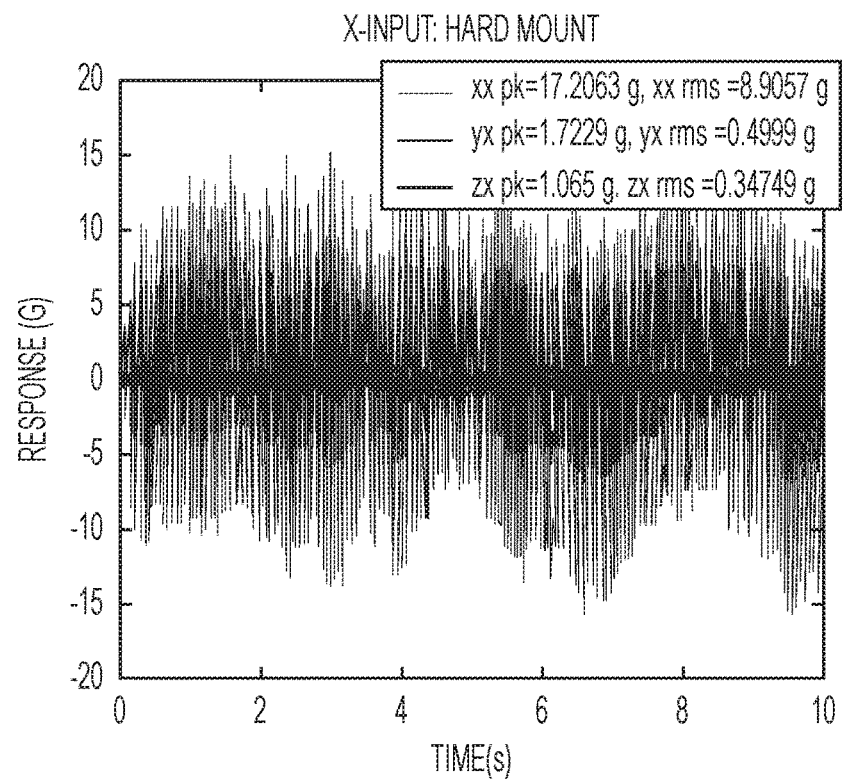
FIG. 14 is an illustrative graph of load response over time of a digital model of a hard-mounted searchlight, to a first vibrational input.

FIG. 14 is a graph over time of the load response of the hard mounted searchlight to an x-axis input vibration. As shown, the searchlight has a strong x-axis load response, peaking at as much as 17 g (standard gravity). This is not an isolated peak either, with the root mean square at approximately 9 g. Such intense loading may be sufficient to damage the searchlight, particularly over sustained periods.

Figure 15:
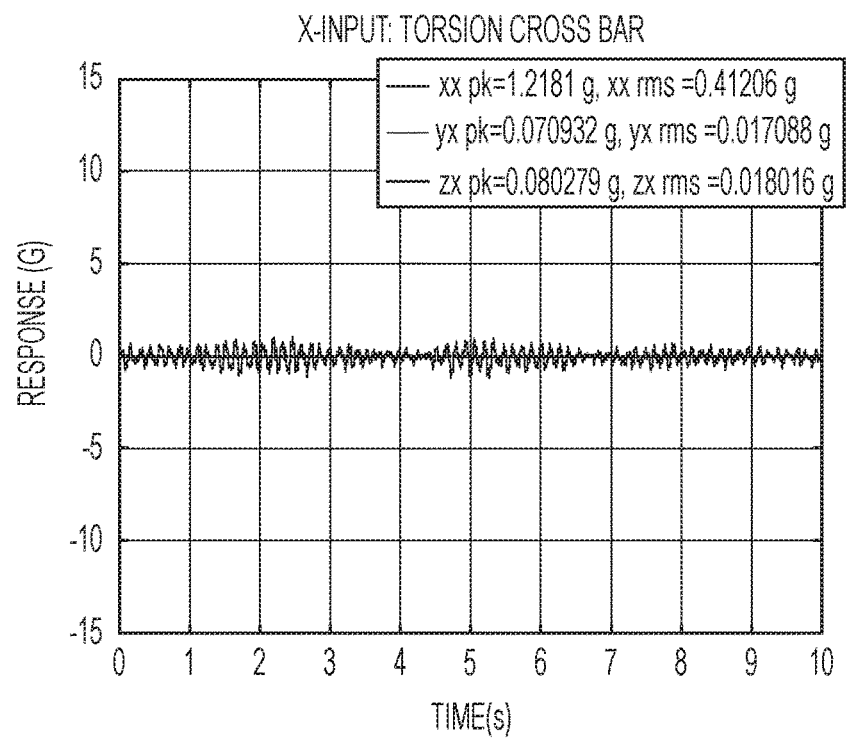
FIG. 15 is an illustrative graph of load response over time of a digital model of a torsion bar device-mounted searchlight, to the first vibrational input.

FIG. 15 is a corresponding graph over time of the load response of the searchlight attached by mounting system 100, to the same x-axis input vibration. By contrast, the x-axis load response peaks at only about 1 g, with root mean square of less than 1 g. This demonstrates the significant vibration isolation provided by the tuned torsion cross of mounting system 100.

Figure 16:
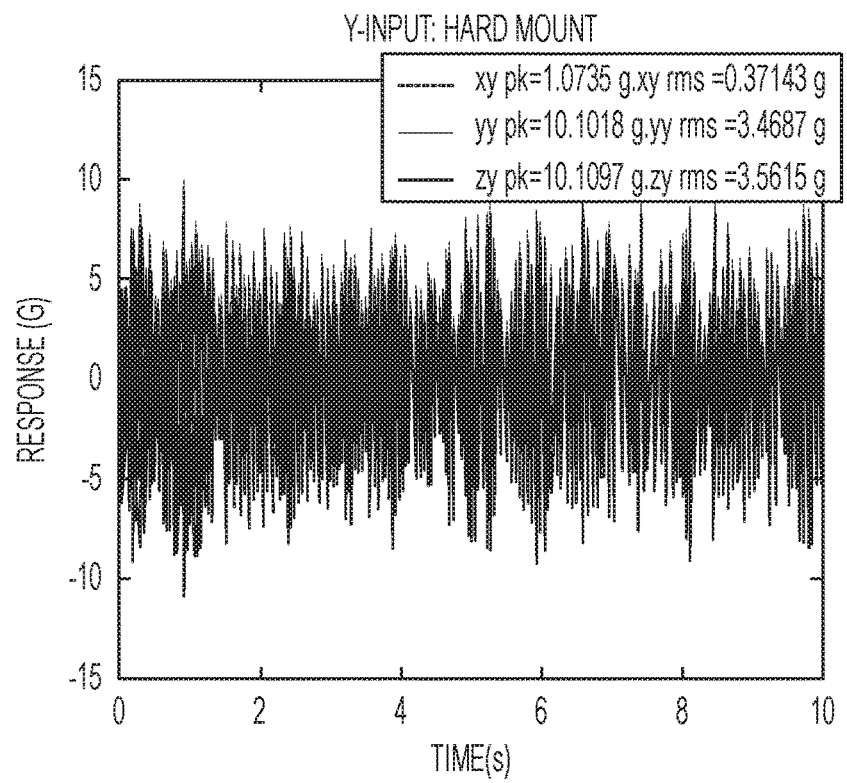
FIG. 16 is an illustrative graph of load response over time of a digital model of a hard-mounted searchlight, to a second vibrational input.
Figure 17:
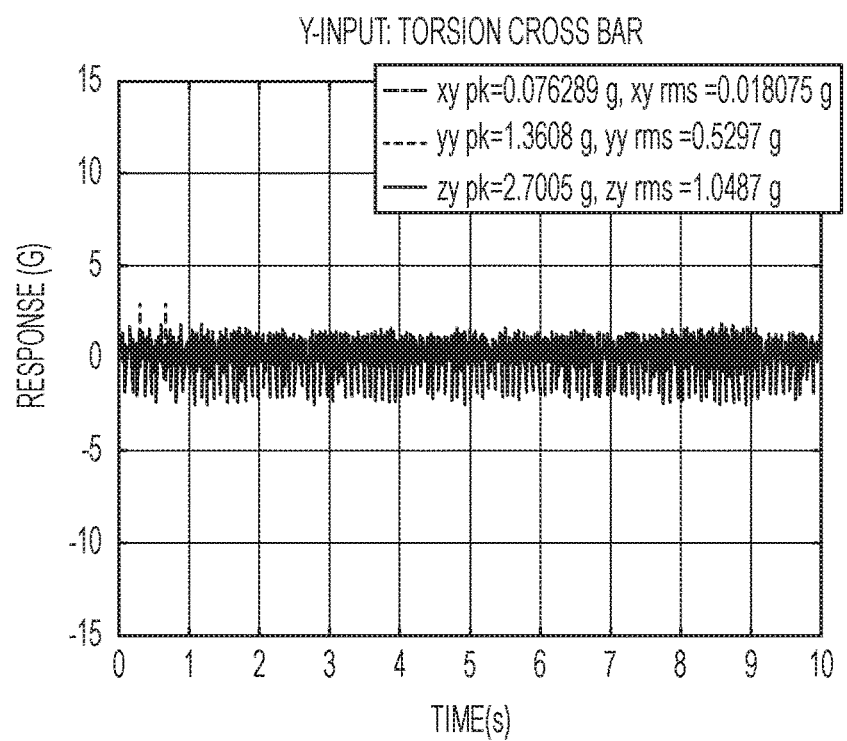
FIG. 17 is an illustrative graph of load response over time of a digital model of a torsion bar device-mounted searchlight, to the second vibrational input.

The graph in FIG. 16 shows the response of the hard mounted searchlight to a y-axis input vibration. In this case, the searchlight has a strong load response in both y and z axes, peaking at about 10 g. The graph in FIG. 17 shows a y-axis peak of about 1 g and a z-axis peak of about 3 g for the searchlight attached by mounting system 100. Again, the simulation demonstrates the significant vibration isolation provided by the tuned torsion cross of mounting system 100.

B. Illustrative Method of Mounting

Figure 18:
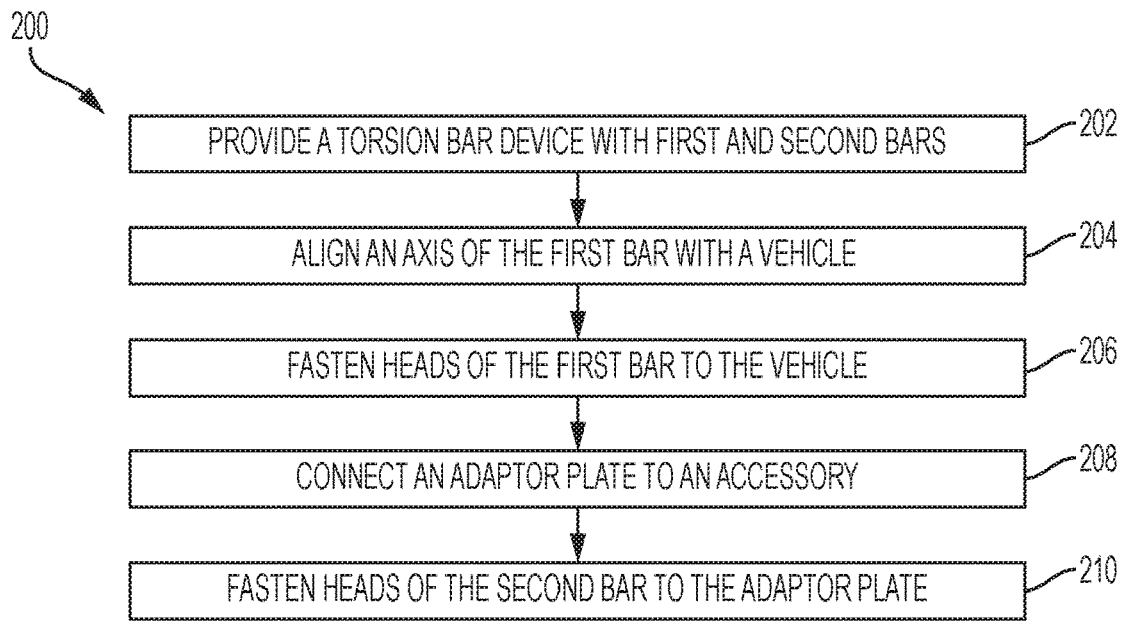
FIG. 18 is a flow chart depicting steps of an illustrative method of mounting an accessory on a vehicle according to the present teachings.

This section describes steps of an illustrative method of mounting an accessory on a vehicle; see FIG. 18. Aspects of mounting systems and/or torsion bar devices described above may be utilized in the method steps described below. Where appropriate, reference may be made to components and systems that may be used in carrying out each step. These references are for illustration, and are not intended to limit the possible ways of carrying out any particular step of the method.

FIG. 18 is a flowchart illustrating steps performed in an illustrative method, and may not recite the complete process or all steps of the method. Although various steps of a method 200 are described below and depicted in FIG. 18, the steps need not necessarily all be performed, and in some cases may be performed simultaneously or in a different order than the order shown.

At step 202, the method includes providing a torsion bar device with first and second bars. The torsion bar device may be a single piece of material, such as a titanium alloy. The first and second bars may be elongate, each defining an axis. The axis of the first bar may be generally perpendicular to the axis of the second bar. Each bar may have a head at first and second ends, connected by a middle portion. The middle portions of the first bar and the second bar may be connected by a common hub portion. Rotation of one bar may exert a torque causing a twist or torsion of the other bar.

The middle portions may each be configured to damp or filter vibrations of one or more selected frequencies. Each bar may have a selected stiffness and/or response to twisting forces. The torsion bar device may be described as tuned for a specific vehicle and/or accessory.

Step 204 includes orienting an axis of the first bar with a vehicle. The axis may be aligned substantially parallel with or perpendicular to a primary direction of travel of the vehicle. In some examples, the axis may be aligned relative to a source of vibration included in the vehicle, such as an engine.

At step 206, method 200 includes fastening heads of the first bar to the vehicle. The heads may be securely connected to the vehicle in any effective manner. For example, the heads may be bolted to the vehicle. For another example, the heads may be riveted or bonded to the vehicle. The first bar may be fastened to any portion of the vehicle that provides a secure connection. For example, the heads may be directly or indirectly connected to a frame of the vehicle. In some examples the vehicle may be configured for connection, and may include mounting structures or other features to facilitate fastening of the first bar of the torsion bar device.

Step 208 includes connecting an adaptor plate to an accessory. Accessories including delicate parts of sensitive electronics and/or accessories that would cause significant fatigue to other mountings may be particularly appropriate, but the accessory may be any structure or equipment to be mounted to the vehicle. The adaptor plate may be connected to the accessory by one or more fasteners, or by any effective method.

The adaptor plate may be configured both for connection to the accessory and for fastening to the second bar of the torsion bar device. In some examples, the accessory may be configured for attachment to the second bar of the torsion bar device. In such examples, step 208 may be omitted.

At step 210, the method includes fastening heads of the second bar to the adaptor plate. Similarly to step 206, the second bar may be securely connected to the adaptor plate in any effective manner, such as bolting or bonding. In examples where step 208 is omitted, the heads of the second bar may be fastened directly to the accessory instead.

C. Illustrative Method of Design

Figure 19:
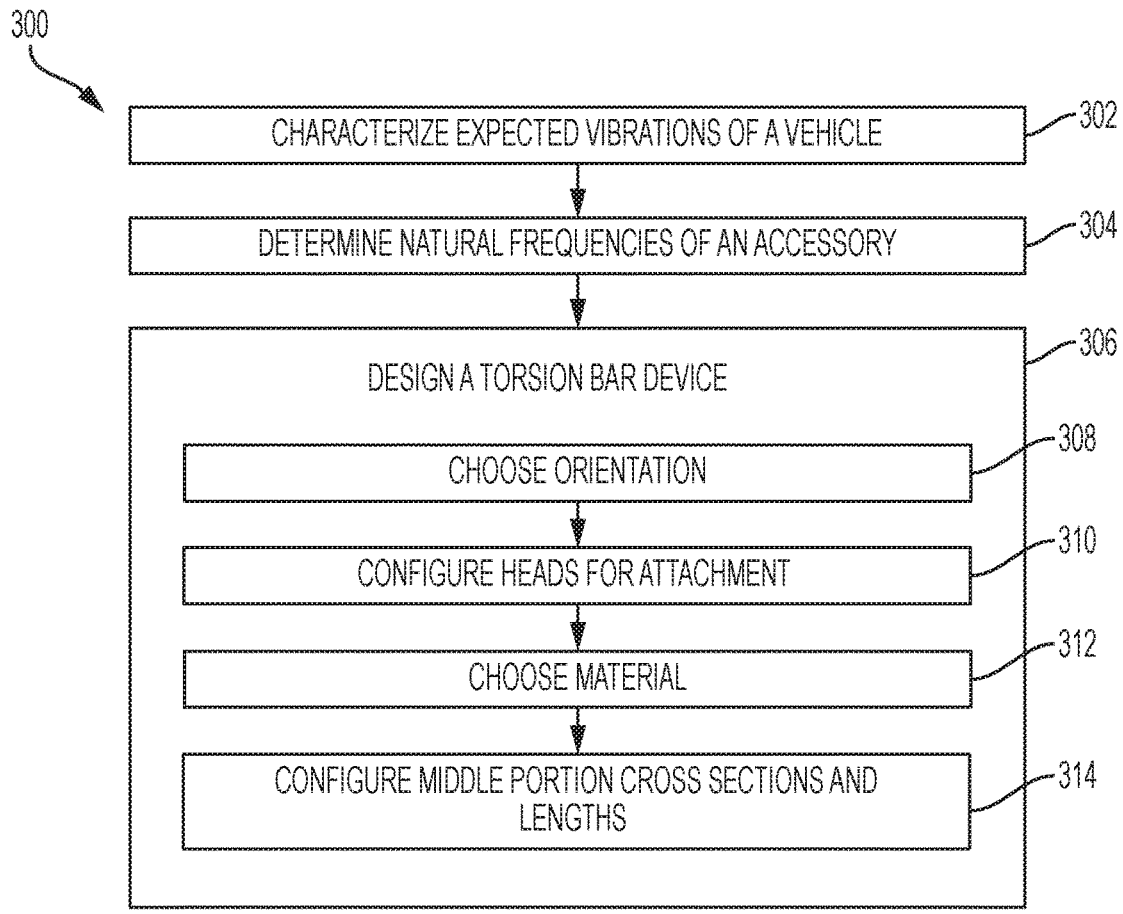
FIG. 19 is a flow chart depicting steps of an illustrative method of designing a multi-axis torsion bar device according to the present teachings.

This section describes steps of an illustrative method of designing a torsion bar device for connection of an accessory to a vehicle; see FIG. 19. Where appropriate, reference may be made to components and systems that may be used in carrying out each step. These references are for illustration, and are not intended to limit the possible ways of carrying out any particular step of the method.

FIG. 19 is a flowchart illustrating steps performed in an illustrative method, and may not recite the complete process or all steps of the method. Although various steps of a method 300 are described below and depicted in FIG. 19, the steps need not necessarily all be performed, and in some cases may be performed simultaneously or in a different order than the order shown.

At step 302, the method includes characterizing expected vibrations of a vehicle. One or more vibrations may be characterized, by methods such as calculation from mechanical models, known vibrational properties of the vehicle, and/or measurement of vibrations during operation of the vehicle. For each vibration or set of vibrations characterized, one or more properties may be determined. For example, wave properties such as frequency, amplitude, and direction may be determined. For another example, operational properties such as source, duration, and frequency of occurrence may be determined.

Step 304 includes determining natural frequencies of an accessory. The natural or resonant frequencies and/or vibrational modes of the accessory may be determined by calculation from a mechanical model, by testing of the accessory, or by any effective method. A subset of all natural frequencies of the accessory may be determined, according to the expected vibrations of the vehicle. For example, if the expected vibrations of the vehicle are characterized in step 302 as lying within a frequency range, only natural frequencies within that frequency range may be determined.

The accessory may also be analyzed for responses to the expected vibrations of the vehicle, in the short term or over a planned operational lifetime of the accessory. Those vibrations found to cause most damage or to cause otherwise unacceptable responses of the accessory may also identified as targets for vibration filtering.

At step 306, the method includes designing a torsion bar device. The torsion bar device may include one or more elongate torsion bar members. Each bar member may have a head at first and second ends, connected by a middle portion. The middle portions of the bar members may be connected by a common hub portion. Rotation of one bar member may exert a torque causing a twist or torsion of another bar member.

The torsion bar device may be designed to reduce transmission of vibrations between the vehicle and the accessory.

Designing the torsion bar device includes four sub-steps. Sub-step 308 includes choosing an orientation. The orientation may be chosen such that the torsion bar device most effectively reduces the expected vibrations of the vehicle. The orientation may additionally or alternatively be chosen such that the torsion bar device reduces the transmission of selected target frequencies or the expected vibrations of the vehicle, such as natural frequencies of the accessory. The orientation may be chosen such that the torsion bar device most effectively reduces those expected vibrations of the vehicle that occur most often or for the greatest duration. Any effective orientation may be chosen.

At sub-step 310, step 306 of the method includes configuring heads for attachment. The heads may be disposed at first and second ends of the bar members of the torsion bar device. Configuring the heads may comprise including apertures or other features to facilitate use of fasteners. Configuring the heads may also comprise selecting shape and dimension of the heads to provide a secure connection of the torsion bar device. The heads may be further configured to space the middle portions of the bar members from the vehicle and the accessory, providing room for appropriate motion of the torsion bar device.

Sub-step 312 includes choosing a material. The torsion bar device may comprise a single piece of material. A material may be selected according to expected operational conditions of the vehicle, such as typical temperature range or likely temperature fluctuations. The selected material may be sufficiently robust, or have appropriate qualities to resist fatigue and/or adverse environmental conditions. The material may also be selected provide a desired stiffness of the bar members.

At sub-step 314, step 306 of the method includes configuring the cross section and length of the middle portions of the bar members. The geometry of the middle portions may be configured to provide a desired stiffness of the bar members, in combination with the chosen material of the torsion bar device. The desired stiffness may be calculated based on the expected vibrations of the vehicle, and/or may be calculated such that the torsion bar device reduces the transmission of selected target frequencies or the expected vibrations of the vehicle. The desired stiffness may also be calculated such that the torsion bar device most effectively reduces those expected vibrations of the vehicle that occur most often or for the greatest duration.

In some examples the bar members may be configured to place the fundamental vibration modes of the accessory. In some examples, the torsion bar device may be configured to reduce to act as a low-pass filter, or to damp one or more natural frequencies of the accessory.

D. Illustrative Combinations and Additional Examples

This section describes additional aspects and features of mounting devices and systems, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A mounting device, comprising:

a first torsion bar structure having an elongated axis and opposing end portions connected by a middle portion of the first torsion bar structure, a second torsion bar structure having an elongated axis and opposing end portions connected by a middle portion of the second torsion bar structure, the middle portion of the second torsion bar structure being connected to the middle portion of the first torsion bar structure, the end portions of the first torsion bar structure being configured for attachment to a vehicle, the end portions of the second torsion bar structure being configured for attachment to an accessory, wherein the first torsion bar structure and the second torsion bar structure are configured to decrease transmission of vibration frequencies between the vehicle and the accessory.

A1. The mounting device of A0, wherein the elongated axis of the first torsion bar structure forms an angle with the elongated axis of the second torsion bar structure.

A2. The mounting device of any of A0-A1, wherein the elongated axis of the first torsion bar structure is orthogonal to the elongated axis of the second torsion bar structure.

A3. The mounting device of any of A0-A2, wherein each torsion bar structure has a middle portion characterized by a length and cross-sectional shape selected to minimize transmission of vibration frequencies from the vehicle to the accessory.

A4. The mounting device of any of A0-A3, wherein the first and second torsion bar structures extend from a common hub portion, the torsion bar structures and hub portion all formed from a single piece of material.

A5. The mounting device of claim A4, wherein the single piece of material comprises titanium.

A6. The mounting device of any of A0-A5, wherein the elongated axis of the first torsion bar structure is aligned in parallel with a primary direction of travel of the vehicle.

A7. The mounting device of any of A0-A6, wherein the vehicle is configured for travel on or in at least one of land, air, and space.

A8. The mounting device of any of A0-A7, wherein each torsion bar structure is configured to decrease transmission of vibration frequencies from the vehicle to the accessory in a particular direction.

A9. The mounting device of any of A0-A8, wherein the opposing end portions of each torsion bar structure are enlarged relative to the middle portion of the torsion bar structure.

A10. The mounting device of any of A0-A9, wherein the first and second torsion bar structures are configured to decrease transmission of a selected vibration frequency, the selected frequency being a natural frequency of the accessory.

A11. The mounting device of any of A0-A10, wherein the mounting device is configured to act as a low pass vibration filter.

A12. The mounting device of any of A0-A11, wherein the opposing end portions of the first torsion bar structure are configured for connection such that the middle portion of the first torsion bar structure is spaced from the vehicle and the opposing end portions of the second torsion bar structure are configured for connection such that the middle portion of the second torsion bar structure is spaced from the accessory.

A13. The mounting device of any of A0-A12, wherein the elongated axis of the first torsion bar structure is aligned in parallel with a primary direction of motion of the vehicle.

B0. A carrying system, comprising:
a vehicle configured to travel in one or more directions,
an accessory,
a system for mounting the accessory on the vehicle including a torsion bar device having first and second elongated bar members extending from a hub portion, the first elongated bar member having opposing end portions configured for attachment to the vehicle, the second elongated bar member having opposing end portions configured for attachment to the accessory, each torsion bar member being configured to decrease transmission of vibration frequencies between the vehicle and the accessory.

B1. The carrying system of B0, wherein each bar member has an elongated axis, the elongated axis of the first bar member being orthogonal to the elongated axis of the second bar member.

B2. The carrying system of B1, wherein the vehicle has a primary direction of travel, the elongated axis of the first bar member being parallel with the primary direction of travel.

B3. The carrying system of any of B0-B2, wherein the vehicle is configured for travel on or in at least one of land, air, and space.

B4. The carrying system of any of B0-B3, wherein each bar member has a middle portion configured to decrease transmission of vibration frequencies from the vehicle to the accessory in a particular direction.

B5. The carrying system of B4, wherein each middle portion is characterized by a length and cross-sectional shape selected to minimize transmission of vibration frequencies.

B6. The carrying system of any of B4-B5, wherein the opposing end portions of each bar member are enlarged relative to the middle portion.

B7. The carrying system of any of B0-B6, wherein the first bar member, second bar member, and hub portion are all formed from a single piece of material.

B8. The carrying system of B7, wherein the single piece of material comprises titanium.

B9. The carrying system of any of B0-B8, wherein each bar member is configured to decrease transmission of a selected vibration frequency, the selected frequency being a natural frequency of the accessory.

B10. The carrying system of any of B0-B9, wherein the torsion bar device is configured to act as a low pass vibration filter.

B11. The carrying system of any of B0-B10, wherein the opposing end portions of each bar member are configured for connection such that the hub portion is spaced from the vehicle and from the accessory.

B12. The carrying system of any of B0-B11, wherein each bar member has an elongated axis, the elongated axis of the first bar member forming an angle with the elongated axis of the second bar member.

B13. The carrying system of B12, wherein the vehicle has a primary direction of motion, the elongated axis of the first bar member being parallel with the primary direction of motion.

C0. A method of mounting an accessory on a vehicle, comprising:
providing a torsion bar device having first and second bar structures extending from a common hub portion, each bar structure having an elongated axis, and opposing head portions connected by a middle portion, the elongated axis of the first bar member forming an angle with the elongated axis of the second bar structure,
fastening the head portions of the first bar structure to a vehicle, and
fastening the head portions of the second bar structure to an accessory, wherein the middle portions of the bar structures are configured to decrease transmission of vibration between the vehicle and the accessory.

C1. The method of C0, wherein the elongated axis of the first bar structure is orthogonal to the elongated axis of the second bar structure.

C2. The method of any of C0-C1, wherein the first fastening step includes: orienting the elongated axis of the first bar structure with a primary direction of travel of the vehicle.

C3. The method of any of C0-C2, wherein the second fastening step includes: connecting the second bar structure to the accessory via an adapter plate.

C4. The method of any of C0-C3, wherein the elongated axis of the first bar structure forms an angle with the elongated axis of the second bar structure.

C5. The method of any of C0-C4, wherein the first fastening step includes: orienting the elongated axis of the first bar structure with a primary direction of motion of the vehicle.

D0. A multi-axis torsion bar device, comprising:
plural bar structures extending from a common hub portion, each bar structure having opposing end portions configured for connection to a different moveable body portion and a middle portion configured to decrease transmission of vibration frequencies between multiple body portions.

D1. The multi-axis torsion bar device of D0, wherein a first of the plural bar structures has a first elongated axis, and a second of the plural bar structures has a second elongated axis perpendicular to the first elongated axis.

D2. The multi-axis torsion bar device of any of D0-D1, wherein the plural bar structures and hub portion are formed from a single piece of material.

D3. The multi-axis torsion bar device of any of D0-D2, wherein the single piece of material comprises titanium.

D4. The multi-axis torsion bar device of any of D0-D3, wherein the end portions or each bar structure are enlarged relative to the middle portion.

D5. The multi-axis torsion bar device of any of D0-D4, wherein the middle portion of each bar structure has a cross-sectional shape and a length selected to minimize transmission of vibration frequencies between moveable bodies.

D6. The multi-axis torsion bar device of any of D0-D5, wherein the middle portion of each bar structure has a cross-sectional shape and a length selected to minimize transmission of vibration frequencies between an aircraft and an accessory.

D7. The multi-axis torsion bar device of any of D0-D6, wherein each torsion bar member is configured to decrease transmission of a selected vibration frequency, the selected frequency being a natural frequency of one of the movable body portions.

D8. The multi-axis torsion bar device of any of D0-D7, wherein the torsion bar device is configured to act as a low pass vibration filter.

D9. The multi-axis torsion bar device of any of D0-D8, wherein the opposing end portions of each bar structure are configured for connection such that the middle portion is spaced from the corresponding body portion.

E0. A method of designing a multi-axis torsion bar device for connection of an accessory to a vehicle, comprising:
characterizing expected vibration frequencies of a vehicle in a first direction, and expected vibration frequencies of the vehicle in a second direction orthogonal to the first direction,
designing a single piece torsion bar device having first and second bar structures extending from a common hub portion, configured to mount an accessory to the vehicle, and to decrease transmission of vibration frequencies from the vehicle to the accessory.

E1. The method of E0, wherein the designing step includes configuring a middle portion of the first bar structure to decrease transmission of vibration frequencies from the vehicle to the accessory in the first direction, and configuring a middle portion of the second bar structure to decrease transmission of vibration frequencies from the vehicle to the accessory in the second direction.

E2. The method of any of E0-E1, further comprising:
characterizing natural vibration frequencies of the accessory;
wherein the designing step includes configuring the single piece torsion bar device to decrease transmission of the characterized natural vibration frequencies from the vehicle to the accessory.

Advantages, Features, and Benefits

The different embodiments and examples of the mounting device described herein provide several advantages over known solutions for mounting an accessory to a vehicle. For example, illustrative embodiments and examples described herein have no moving parts.

Additionally, and among other benefits, illustrative embodiments and examples described herein reduce the stress of an accessory attachment and are fatigue resistant.

Additionally, and among other benefits, illustrative embodiments and examples described herein are insensitive to environmental conditions such as sand, dust, rain, ice, and temperature fluctuations.

Additionally, and among other benefits, illustrative embodiments and examples described herein are compact and lightweight.

No known system or device can perform these functions, particularly at such low manufacturing cost and with such a simple design. Thus, the illustrative embodiments and examples described herein are particularly useful for highly loaded vibration environments. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A mounting device, comprising:
a first torsion bar structure having an elongated axis and opposing end portions connected by a middle portion of the first torsion bar structure, and
a second torsion bar structure having an elongated axis and opposing end portions connected by a middle portion of the second torsion bar structure, the middle portion of the second torsion bar structure being connected to the middle portion of the first torsion bar structure, the end portions of the first torsion bar structure being configured for attachment to a vehicle, the end portions of the second torsion bar structure being configured for attachment to an accessory, the middle portions of the first and second torsion bars being separated from the vehicle and the accessory,
wherein the first torsion bar structure and the second torsion bar structure are configured to decrease transmission of vibration frequencies between the vehicle and the accessory, the first torsion bar structure having a stiffness selected to decrease transmission of a selected frequency, the selected frequency being a natural frequency of the accessory.

2. The mounting device of claim 1, wherein the elongated axis of the first torsion bar structure forms an angle with the elongated axis of the second torsion bar structure.

3. The mounting device of claim 2, wherein the elongated axis of the first torsion bar structure is orthogonal to the elongated axis of the second torsion bar structure.

4. The mounting device of claim 1, wherein each torsion bar structure has a middle portion characterized by a length and cross-sectional shape selected to minimize transmission of vibration frequencies from the vehicle to the accessory.

5. The mounting device of claim 1, wherein the first and second torsion bar structures extend from a common hub portion, the torsion bar structures and hub portion all formed from a single piece of material.

6. The mounting device of claim 5, wherein the single piece of material comprises titanium.

7. The mounting device of claim 1, wherein the opposing end portions of the first torsion bar structure are configured for connection such that the middle portion of the first torsion bar structure is spaced from the vehicle and the opposing end portions of the second torsion bar structure are configured for connection such that the middle portion of the second torsion bar structure is spaced from the accessory.

8. The mounting device of claim 1, wherein the first and second torsion bar structures are configured to act as a low pass vibration filter.

9. The mounting device of claim 1, wherein the second torsion bar structure is configured to decrease transmission of the selected vibration frequency.

10. A mounting device, comprising:
a first torsion bar structure having an elongated axis and opposing end portions connected by a middle portion of the first torsion bar structure,
a second torsion bar structure having an elongated axis and opposing end portions connected by a middle portion of the second torsion bar structure, the middle portion of the second torsion bar structure being connected to the middle portion of the first torsion bar structure, the end portions of the first torsion bar structure being configured for attachment to a vehicle, the end portions of the second torsion bar structure being configured for attachment to an accessory, wherein the first torsion bar structure and the second torsion bar structure are configured to decrease transmission of vibration frequencies between the vehicle and the accessory,
wherein the opposing end portions of each torsion bar structure are enlarged relative to the respective middle portion of the respective torsion bar structure.

11. A carrying system, comprising:
a vehicle configured to travel in one or more directions,
an accessory,
a system for mounting the accessory on the vehicle including a torsion bar device having first and second elongated torsion bar members extending from a hub portion, the first elongated torsion bar member having opposing end portions configured for attachment to the vehicle, the second elongated torsion bar member having opposing end portions configured for attachment to the accessory, each torsion bar member being configured to decrease transmission of vibration frequencies between the vehicle and the accessory,
wherein the hub portion is separated from the vehicle and the accessory and the first torsion bar structure has a stiffness selected to decrease transmission of a selected frequency, the selected frequency being a natural frequency of the accessory.

12. The carrying system of claim 11, wherein each bar member has an elongated axis, the elongated axis of the first bar member forming an angle with the elongated axis of the second bar member.

13. The carrying system of claim 12, wherein the vehicle has a primary direction of motion, the elongated axis of the first bar member being parallel with the primary direction of motion.

14. The carrying system of claim 11, wherein the vehicle is configured for travel on or in at least one of land, air, and space.

15. The carrying system of claim 11, wherein each bar member has a middle portion configured to decrease transmission of vibration frequencies from the vehicle to the accessory in a particular direction.

16. The carrying system of claim 11, wherein the opposing end portions of each bar member are configured for connection such that the hub portion is spaced from the vehicle and from the accessory.

17. A method of mounting an accessory on a vehicle, comprising:
selecting a natural frequency of the accessory,
selecting a torsion bar stiffness to decrease transmission of the selected natural frequency,
providing a torsion bar device having first and second torsion bar structures, each torsion bar structure having an elongated axis and opposing head portions connected by a middle portion, the middle portion of the second torsion bar structure being connected to the middle portion of the first torsion bar structure, and the elongated axis of the first torsion bar structure forming an angle with the elongated axis of the second torsion bar structure, wherein the first torsion bar structure has the selected torsion bar stiffness,
fastening the head portions of the first bar structure to the vehicle, and
fastening the head portions of the second bar structure to the accessory, wherein the first and second torsion bar structures are configured to decrease transmission of vibration between the vehicle and the accessory, and the middle portions of the first and second torsion bars are separated from the vehicle and the accessory.

18. The method of claim 17, wherein the elongated axis of the first bar structure forms an angle with the elongated axis of the second bar structure.

19. The method of claim 17, wherein the first fastening step includes:
orienting the elongated axis of the first bar structure with a primary direction of motion of the vehicle.

20. The method of claim 17, wherein the second fastening step includes:
connecting the second bar structure to the accessory via an adapter plate.

* * * * *